March 18, 1969

G. L. OMON 3,433,502

ARTICULATED VEHICLE

Filed April 20, 1967

INVENTOR.
GENE L. OMON

BY

WILSON, SETTLE, BATCHELDER
ATT'YS. & CRAIG.

United States Patent Office 3,433,502
Patented Mar. 18, 1969

3,433,502
ARTICULATED VEHICLE
Gene L. Omon, Wauwatosa, Wis., assignor to J. I. Case
Company, Racine, Wis., a corporation of Wisconsin
Filed Apr. 20, 1967, Ser. No. 632,294
U.S. Cl. 280—400          4 Claims
Int. Cl. B62d 53/02; F16c 23/00

ABSTRACT OF THE DISCLOSURE

An articulated vehicle having an improved hinge means for pivotally interconnecting the articulated sections of the vehicle, such as a self-propelled bucket loader.

Background of the disclosure

Figure 1:
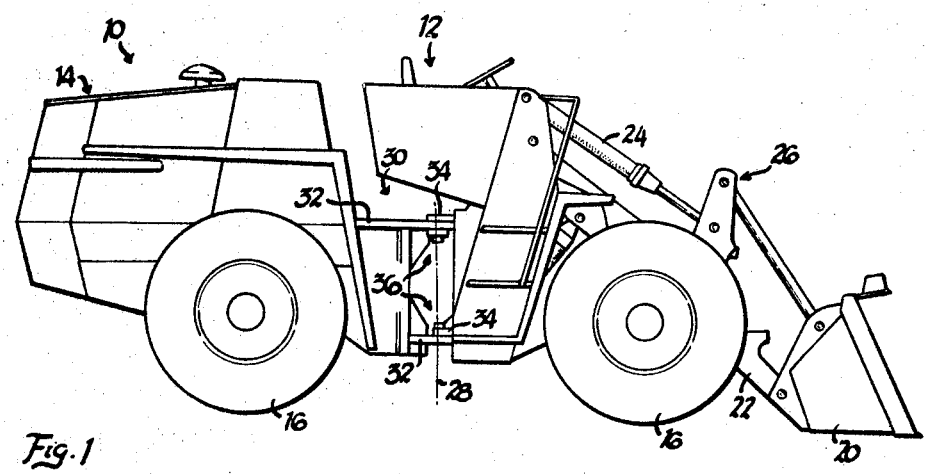

The present invention relates generally to articulated vehicles and more particularly to an improved pivot connection for defining the pivot point of the articulated sections.

The recent trend in the design and construction of heavy earth moving equipment has utilized articulated vehicle sections so that the implement or tool carried by one of the vehicle sections is always properly oriented for the direction of travel of that particular section. Furthermore, an articulated vehicle of this type is highly desirable since one section, which houses the power plant, can be of rather standard design and can readily be interconnected with a second section to produce a variety of special purpose vehicles.

One of the problems encountered in the construction of a vehicle of the above type is the bearings which provide the pivot joint between the sections of the vehicle. One solution to this problem includes providing a pair of spaced hinges on a common vertical axis with a bearing at each of the hinged points having complementary spherical surface for providing the pivot joint between the articulated sections. Such a pivotal connection is disclosed and described in an article entitled "Bearings and the Hinge of an Articulated Vehicle" published in the September 1966 issue of Power Transmission Design (volume 8, No. 9, pages 33–35).

However, this type of pivot joint for a pivotal connection, such as disclosed above, has not proven satisfactory in use. The primary objection to a pivotal connection having a bearing or bearings of this type, is that most of the wear resulting from the continuous pivotal movement of the respective sections will occur on the bearing surfaces disposed on the respective races of the bearing. This means that, after a predetermined amount of use, the bearings must be replaced since there is no satisfactory manner to compensate for the wear occurring between the bearing surfaces. Since vehicles of the above type are generally operated in atmospheric surroundings in which dust and air-borne solids are necessarily present, extreme wear is experienced by the bearing surfaces which means that the bearings must be continuously replaced in order to be even partially satisfactory.

Summary of the invention

The primary object of the present invention is to provide an improved pivotal connection between rotatable elements and wherein the wear occasioned by the relative movement is automatically compensated for in the pivot joint.

Another object is to provide improved bearing surfaces for the pivot point between articulated sections of a vehicle.

A further object is to provide improved pivotal means interconnecting articulated sections which do not require close tolerance dimensions on the main sections of the vehicle.

Other objects and features of the invention will become apparent when considered in conjunction with the following specification and the accompanying drawings.

Figure 2:
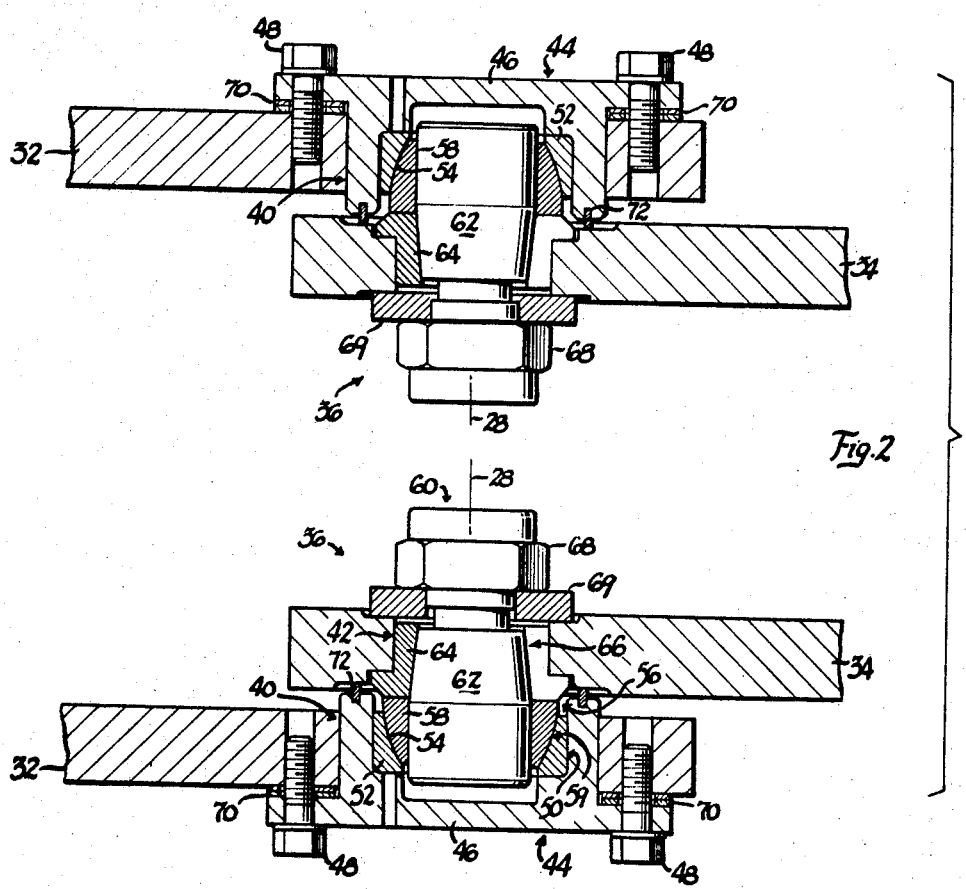

As shown in the drawings:

FIGURE 1 shows a side elevational view of an articulated vehicle having the pivot means of the invention incorporated therein; and FIGURE 2 is a vertical sectional view showing the hinged points of the pivotal means shown in FIGURE 1.

In the specification:

Reference numeral 10 of FIGURE 1 indicates generally an articulated industrial vehicle having a front section 12 and a rear section 14. The sections or frames 12 and 14 are each supported by a pair of spaced wheels 16 (only two being shown) with the rear frame or section 14 housing the propulsion system for the vehicle while the front section or frame 12 supports an implement or tool.

In the illustrated embodiment, the implement or tool comprises a bucket 20 pivotally supported on arms 22 with the opposite ends of the arms pivoted to the articulated section 12. The bucket 20 is capable of being rotated on the arms 22 through fluid actuators 24 and linkage means 26. Also, the arms 22 are capable of being pivoted on the articulated section 12 through fluid actuators 27.

The front and rear frames 12, 14 are capable of being rotated about a common axis 28 through pivot means generally designated as 30.

According to the invention, the pivot means for the articulated sections include first pair of spaced arms 32 rigidly secured to the rear frame 14 and vertically spaced from each other. A second pair of arms 34 are fixedly secured to the front frame 12 and extend rearwardly intermediate the first pair of arms 32. Means 36 are provided for pivotally interconnecting the respective pairs of arms 32 and 34.

Although pivotal connections are provided for each of the adjacent arms 32, 34, the connections are identical and reversed, only one will be described in detail.

As clearly shown in FIGURE 2, the pivotal connections or hinge means 36 each including means defining a pair of openings 40 and 42 respectively located in the arms 32 and 34 with the center of the openings lying on a common axis defined by the pivot axis 28 of the articulated sections. The opening 40 receives first means 44 defining an arcuate bearing surface. The means 44 includes a member 46 removably secured in the opening 40 by bolts 48 and has a recess therein defining a second opening 50. A first bearing member 52 is received in the opening 50 and is hollow to define an arcuate bearing surface 54 on the inner surface thereof. The bearing surface 54 defines a semi-hemispherical segment which is the first bearing surface of a bearing 56.

The means defining a second bearing surface 59 complementary to the first surface is a hollow member 58 which is received on the lower portion of a pin 60. The pin 60 has a conical portion 62 intermediate the ends thereof which has a surface 66 in frictional contact with the inner surface of a member 64. The member 64 is split or cut at one point to allow the member to expand around the tapered portion 62 and the member 64 is received in the opening 42 of the arm 34.

The member 64 is part of removable means securing the pin 60 in the opening 42 with a nut 68 threadedly received on the pin 60 forming the remaining portion of the removable means. Preferably, a washer 69 is interposed between the surface of the arm and the nut 68.

The articulated sections are interconnected in the following manner. The openings 40 and 42 are generally aligned to have their centers define a common axis 28.

The pins 60 having the members 58 thereon are secured in the openings 42 of the respective arms 34 in the manner shown in FIGURE 2. The members 52 are then positioned in the respective openings 50 of the members 46 and the member 46 is forced into the opening 40 of the lower arm 32 and secured therein by the bolt 48.

Of course, the weight of the respective sections at the pivot axis 28 will force the complementary surfaces 54, 59 at the lower hinge point into contacting engagement with each other. Thereafter, the upper member 46 having the members 52 defining the arcuate bearing surface is disposed in the opening 40 of the upper arm 32 and suitable shims 70 are provided to fill the space between the adjacent surfaces of the member 46 and the arm 32.

The members 46 may be provided with a resilient portion 72 which engages the adjacent surface of the front arms 34 to provide a seal for the bearing 56.

Upon inspection of FIGURE 2, it is readily apparent that when excessive wear occurs between the bearing surfaces 54, 59 of the respective pivot means 36, the weight of the vehicle sections at the pivot axis 28 will force the lower pivot surfaces into contacting engagement with each other and a slight gap will occur between the surfaces 54, 59 on the upper hinge means. However, this spacing between the respective surfaces at the upper hinge means 36 is readily compensated for by removing the bolts 48 and removing a sufficient number of shims 70 so that a tight fit will result between the bearing surfaces when the structure is reassembled. Of course any wear which may occur between the conical surfaces 62 and 66 may be readily compensated for by tightening the appropriate nut 68.

Thus, it is readily apparent that the invention provides means for compensating for wear between bearing surfaces of articulated sections of a vehicle without continuous replacement of bearings after short periods of use. Furthermore, by providing removable sections in each of the openings of the respective arms, the close tolerances required for the bearing surfaces are provided in the respective removable elements rather than the openings in the arms carried by the main frame sections.

I claim:

1. In an articulated vehicle having front and rear frames with pivotal means interconnecting said frames, said pivotal means including means defining a pair of aligned upper and lower openings with one of said openings in each of said frames, a first bushing received in said lower opening and having an arcuate inner surface defining a bearing surface, a pin having a circular portion and a tapered portion at one end of said circular portion, a hollow member having a circular opening receiving said circular portion of said pin and having an outer surface complementary to said bearing surface, a second bushing received in said upper opening and having an opening therethrough complementary to said tapered portion of said pin and means releasably retaining said pin in said second bushing whereby said bearing surface and said outer surface complementary to said bearing surface define the pivot between said frames.

2. An articulated vehicle as defined in claim 1, in which said complementary surfaces define hemispherical segments.

3. In an articulated vehicle having front and rear frames with pivotal means interconnecting said frames, said pivotal means comprising a first pair of spaced arms secured to one of said frames, a second pair of spaced arms secured to the other of said frames with said second arms disposed intermediate said first arms, means defining an opening in each of said arms with the centers of said openings disposed on a common axis, first means received in the openings of said first pair of spaced arms and defining arcuate bearing surfaces, first and second pins, second means on a portion of each of said pins defining a surface complementary to said arcuate surface, and third means removably securing each of said pins in a respective opening in said second arms with the complementary surface in contacting relation with the corresponding arcuate surface whereby the surfaces define a pivot point between said frames.

4. An articulated vehicle as defined in claim 3, in which said arcuate and complementary surfaces define hemispherical segments whereby the spaces occasioned by wear of said surfaces may be removed by relative movement of said first and second means.

References Cited

UNITED STATES PATENTS

| | | | |
|---|---|---|---|
| 2,360,823 | 10/1944 | Austin. | |
| 2,837,349 | 6/1958 | Hawk | 280—492 |
| 3,253,671 | 5/1966 | Fielding | 180—79.2 X |
| 3,347,577 | 10/1967 | Carlson et al. | 180—51 X |

LEO FRIAGLIA, *Primary Examiner.*

U.S. Cl. X.R.

16—128; 180—51; 308—72